UNITED STATES PATENT OFFICE.

FRITZ HENKEL, OF DUSSELDORF, GERMANY.

PROCESS OF MAKING SOLUBLE ALKALINE SILICATES.

SPECIFICATION forming part of Letters Patent No. 633,841, dated September 26, 1899.

Application filed June 15, 1898. Serial No. 683,503. (No specimens.)

*To all whom it may concern:*

Be it known that I, FRITZ HENKEL, a subject of the King of Prussia, Emperor of Germany, residing at Dusseldorf, in the Kingdom of Prussia and German Empire, have invented certain new and useful Improvements in Processes for the Manufacture of Solid but Easily Soluble Alkaline Silicates, (for which I have applied for patents in England April 27, 1898, No. 9,730; in Austria May 4, 1898; in Hungary May 3, 1898, No. 6,289; in France April 28, 1898, No. 265,241; in Belgium April 27, 1898, No. 105,611, and in Spain April 26, 1898,) of which the following is a specification.

This invention relates to the manufacture of concentrated silicic alkali or alkaline silicate in the form of powder or pieces, easily soluble in cold water, which manufacture has hitherto been attempted without success.

This process is based upon the observation that by intimately mixing solid silicic alkali or alkaline silicate with a little water in the proportion of about six to one and strongly heating the mixture, or by mixing the solid silicic alkali or alkaline silicate with a hot concentrated solution of the silicate, a substance is obtained which cakes together to form a solid mass which can be pulverized and is easily soluble in cold water. During the application of water the solid insoluble silicic alkali or alkaline silicate absorbs the water mechanically without alteration of its properties, specially as regards insolubility; but when the mixture is strongly heated a chemical change takes place between the insoluble particles of the water-glass and the particles of water in contact therewith. Crystalline hydrate is thus formed which can be finely pulverized and which is easily soluble in water. By the application of a hot concentrated solution of the silicate the solution of silicate is transformed into a solid aggregate body without the silicate losing any of its easy solubility, and, further, the solid silicate which was previously insoluble in cold water is simultaneously changed into the soluble form by interchange with the particles of the concentrated solution.

The process is carried out in practice as follows, as an example:

First. Six parts of silicate of sodium or potassium, as it is obtained from the furnace and containing more or less alkali, are pulverized, intimately mixed with one part of water, and the mixture is then strongly heated at a temperature of 100° to 120° centigrade for a short time until the water has disappeared and a homogeneous substance is obtained, which cakes to form a solid mass. The product thus obtained is easily soluble in cold water and may be disintegrated or pulverized.

Second. Silicate of sodium or potassium, as obtained from the furnace and containing more or less sodium or potassium, is dissolved by means of hot water or steam. With this hot solution powdered sodium water-glass or powdered potassium water-glass is mixed, and this mixture is allowed to cool. The mixture becomes solid in very short time and forms a hard cake, which may be disintegrated or pulverized, according to requirement.

Other substances—for instance, such as sawdust, peat, turf, or magnesia—which have no injurious effect on the use of the mixture may be added as a loosening agent when the product is to be used as a fertilizer either during the disintegration or manufacture.

This process allows of easy transportation of the material and saves freight and customs duties, because the product is a concentrated solid silicate easily soluble. The product is to be used especially in the manufacture of silicate manure in dry condition suitable for strewing.

What I claim, and desire to secure by Letters Patent of the United States, is—

1. The herein-described process for treating alkaline silicates, which consists in mixing six parts of a solid alkaline silicate with one part of water, and strongly heating the mixture until the water has disappeared and a homogeneous mass is formed, which mass cakes and is then easily soluble in cold water.

2. The herein-described process of treating alkaline silicates which consists in heating a mixture of solid alkaline silicate and water until the water has become incorporated therewith, adding an alkaline silicate in powdered form while the mixture is hot, and finally allowing the mixture to cool and cake whereby it is rendered easily soluble in cold water.

In testimony whereof I have hereunto set my hand in the presence of two witnesses.

FRITZ HENKEL.

Witnesses:
  WILLIAM ESSENWEIN,
  W. B. PETTIT.